United States Patent [19]
Adams

[11] 3,996,807
[45] Dec. 14, 1976

[54] CENTRIFUGALLY CONTROLLED TOROIDAL TRANSMISSION

[75] Inventor: Frederick John Adams, Campton, England

[73] Assignee: Cam Gears Limited, Hitchin, England

[22] Filed: Feb. 26, 1975

[21] Appl. No.: 553,445

[30] Foreign Application Priority Data
Mar. 5, 1974 United Kingdom ............... 9837/74

[52] U.S. Cl. .............................. 74/190.5; 74/200
[51] Int. Cl.² ...................................... F16H 15/38
[58] Field of Search ......... 74/200, 230.17 E, 190.5, 74/690, 691

[56] References Cited
UNITED STATES PATENTS

| | | | |
|---|---|---|---|
| 2,299,857 | 10/1942 | Solness | 74/691 |
| 2,730,904 | 1/1956 | Rennerfelt | 74/200 |
| 3,033,048 | 5/1962 | Perruca | 74/200 |
| 3,330,163 | 7/1967 | Liu | 74/200 |
| 3,394,607 | 7/1968 | Hubert | 74/230.17 E |
| 3,653,272 | 4/1972 | Scheiter | 74/190.5 |
| 3,727,474 | 4/1973 | Fullerton | 74/200 |

Primary Examiner—Samuel Scott
Assistant Examiner—Allan R. Burke

[57] ABSTRACT

A speed control device includes a pair of rotatable plates having power transmission rollers positioned in a toroidal track formed between the plates by an annular groove in the opposed face of each plate. Each plate is received within a rotatable housing to which the associated plate is keyed so the plate and associated housing must rotate with each other but leaving the plate axially movable relative to its housing. One housing is driven by an engine so its plate is a driving plate which drives the other, driven plate by means of the rollers. This drives the driven plate housing which is a driving housing used to drive an auxilliary device. The rollers are pivotably mounted on an axially immovable support. Biasing means responsive to rotation speed displaces the plates which pivots the rollers thereby changing the radial location of contact between the rollers and the plates. This changes the ratio of angular velocity at which the driven plate is driven relative to the driving plate.

20 Claims, 8 Drawing Figures

CENTRIFUGALLY CONTROLLED TOROIDAL TRANSMISSION

This invention relates to a speed control device, particularly but not exclusively, for driving the auxilliaries of a motor vehicle, such a dynamo, a cooling fan, a water pump, at a substantially constant speed regardless of the speed fluctuations of the vehicle engine.

Such speed control devices for providing, within the operating range of the device, a predetermined output speed, or speed range, in spite of a variable input speed are known, for example from applicants' U.K. Pat. No. 1,297,574 and co-pending U.K. application No. 6,238/73. The predetermined speed may be, for example, a constant speed or it may be a variable speed which however varies at a slower rate than the input speed. The driving pulley and driven pulley in Applicants' aforementioned Patent and Patent Application are connected by a V-belt, in which each of the pulleys comprises two half-sheaves at least one of which is axially biased towards the other one and in which the biasing means of at least one of the pulleys are centrifugally operable means acting directly or through an hydraulic arrangement upon the axially movable half-sheave of the respective pulley.

The known devices have proved to be useful for their intended purpose except that the driving and driven pulleys are connected, as already stated, by a V-belt so that the device does not form an integral unit. The present invention, therefore, aims at providing an integral speed control device which is based on a friction drive speed reduction mechanism broadly as described and claimed in U.K. Pat. No. 254,341. This known mechanism substantially comprises co-axially mounted driven and driving plates, the plates having opposed faces each of which carries an annular groove co-axial with the plates, the grooves being opposed to form a generally toroidal track; a power transmitting roller mounted and running within the track, being rotatable about an axis which lies substantially in a radial plane of the axis of rotation of the plates and engaging within each of the opposed grooves so that on rotation of the driving plate in one direction power is transmitted therefrom through the roller to rotate the driven plate in the opposite direction. A mechanism of this type will hereinafter be referred to as "of the type specified".

Accordingly, the invention provides a speed control device comprising a mechanism of the type specified, wherein the roller is mounted on a carrier, wherein the two plates are biased axially towards the roller into engagement therewith, and wherein the carrier is pivotably mounted about an axis which is substantially normal to the axis of rotation of that roller and remote from the radial plane of rotation of that roller, so that on axial displacement of one of the plates the carrier can pivot to displace, radially relative to the axis of rotation of the plates, the positions of engagement between the roller and the respective grooves to effect a change in ratio of angular velocity at which the driving plate is driven relatively to the driven plate.

It is advantageous for a smooth operation of a device according to the invention if two or more power transmitting rollers are mounted in the chamber. The driving and driven plates may be biased towards each other and into engagement with the roller, or rollers, by any suitable means but preferably one of the plates is biased by centrifugally operable means such as balls acting against the face of the one plae opposite the one face of that plate that carries the annular groove. The plates are preferably accommodated in respective rotatable housings for rotation therewith. The housing accommodating the driving plate may be connected to the vehicle engine by a V-pulley or be connected directly to the crankshaft thereof. Thus, the driving plate housing is a driven housing or pulley. The driven plate housing is a driving housing or pulley which drives another device such as auxilliaries (fan, etc) of the vehicle engine.

In order to make the invention more readily understood, some embodiments thereof will now be described in more detail with reference to the accompanying informal drawings, in which.

Figure 1:
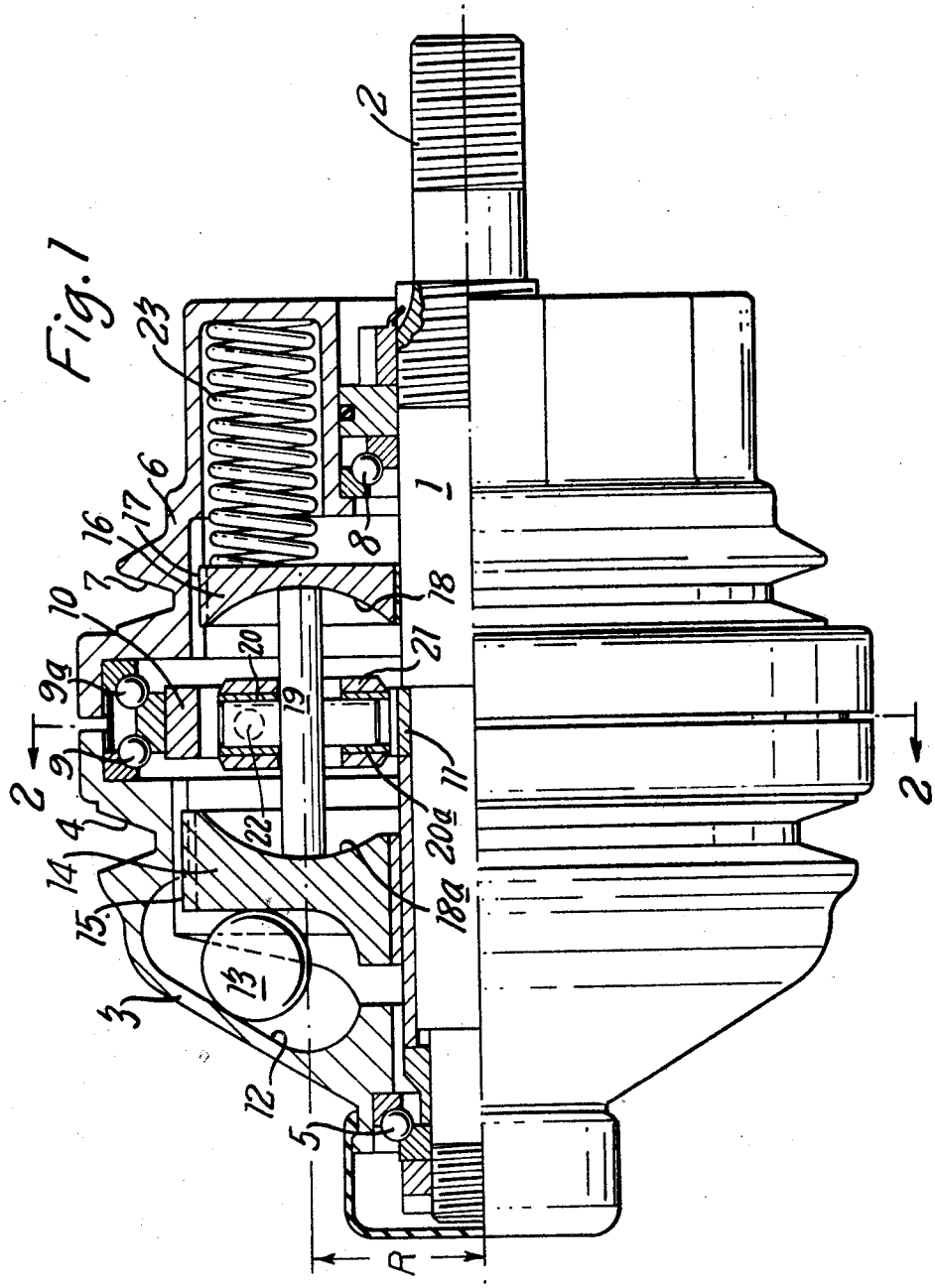
FIG. 1 is a side view, partly in section, of a preferred embodiment of a device according to the invention including a driving plate mounted in a rotatable housing for rotation therewith but being axially displaceable relatively thereto, the housing being driven by a V-belt and the device being substantially at its mid-point of its operating range.

Turning now to the embodiment illustrated in FIGS. 1 to 4, a device according to the invention comprises a non-rotating shaft 1, which at its end 2 is fixed to some stationary point of a vehicle engine or to the vehicle chassis. A housing 3, having on its peripheral wall an integral V-pulley 4 is driven by a V-belt from the engine crankshaft and is rotatably supported on the shaft 1 by a bearing 5. A similar housing 6 provided with an integral driving pulley 7 is also rotatably mounted on the shaft 1 by a bearing 8. The housings 3 and 6 are free to rotate relative to each other and both are supported at their axially innermost, opposing, faces by bearings 9 and 9a, which in turn are supported by a centre disc 10 which is rigidly fixed to the stationary shaft 1 at 11. It will be apparent that the integral V-pulleys provide means by which a power source (e.g., a vehicle engine) is connected to drive the driven housing, and by which the driving housing is connected to drive a belt to power a device, (e.g., auxilliaries, of a vehicle engine). Obviously, means other than integral pulleys, such as a direct connection to an engine crankshaft as illustrated in FIG. 5, may be used.

The internal face of the housing 3, is provided with a number of inclined ball grooves 12 accommodating balls 13 which act upon a plate 14 axially slidably keyed at 15 to the, axially immovable, housing 3 and therefore rotatable with it. As will be seen from FIG. 1, the face of the housing 3 axially opposing its associated plate 14 is inclined, i.e. converges towards the latter as it recedes from the shaft 1 so that when the balls 13 are displaced radially outwardly they will act against the opposing faces and, as a result, displace the plate 14 axially away from the housing 3.

Similarly, a plate 16 is axially slidably keyed at 17 in the bore of the, axially immovable, housing 6 and must therefore rotate with it.

The opposing faces of the plates 14 and 16 are each provided with an annular groove 18 and 18a, respectively, of part-circular section. The grooves are co-axial with their respective plates and are axially opposed to form a generally toroidal track. These grooved faces, and thus the plates, are held apart, in the embodiment illustrated, by three symmetrically arranged rollers 19, which rotate about axes contained in radial planes of the axis of rotation of the plates. The rollers impart by friction means a torque from the plate 14 to the plate 16, albeit in the opposite sense of rotation. The number of rollers 19 may be more or less than those shown in the drawing.

The rollers 19 each rotate in bearings 20 and 20a which are carried in a carrier 21 pivotally hinged at 22 and 22a. Thus, the axis of rotation of each roller 19 can swing either side of the vertical in FIG. 1 under the influence of centrifugal forces from the balls 13 or, conversely, by the restoring forces of a spring 23 carried in the housing 6.

As previously mentioned, FIG. 1 shows the device substantially as the mid-point of its operating range at which the rotational speeds of plates 14 and 16 are equal, as are the angular velocities of the driven pulley 4 and driving pulley 7.

Figure 3:
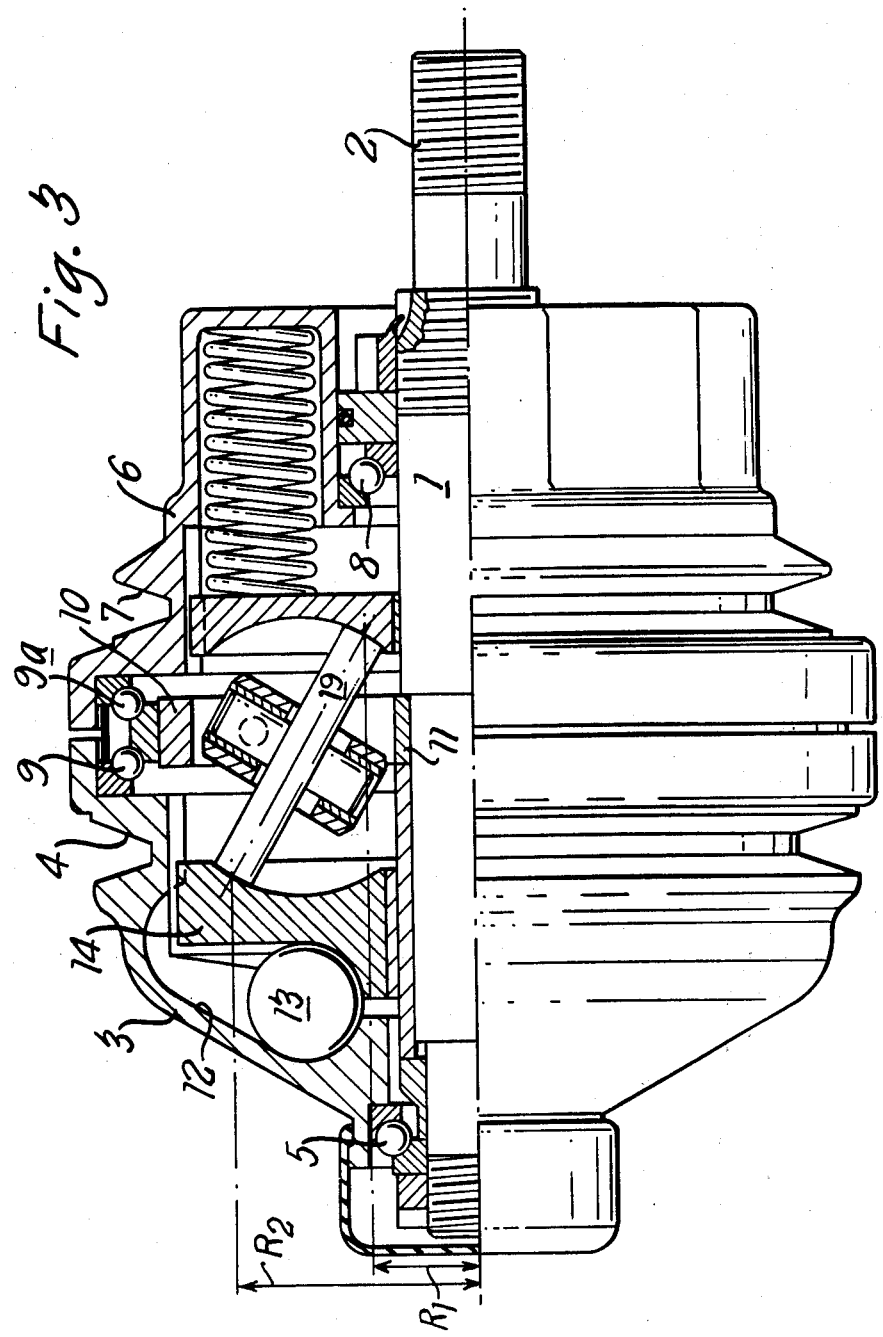
FIG. 3 is a side view, partly in section, of the device illustrated in FIG. 1 when at rest or rotating at a comparatively low speed.

FIG. 3 shows the device at rest or rotating at comparatively slow speed, in which case the centrifugal forces on the balls are insufficient to overcome the spring loads of the spring 23. The slewed position of the rollers 19 creates a ratio change in the device and the angular velocity of the input/output pulleys are in the order of $R_1/R_2$.

Figure 2:
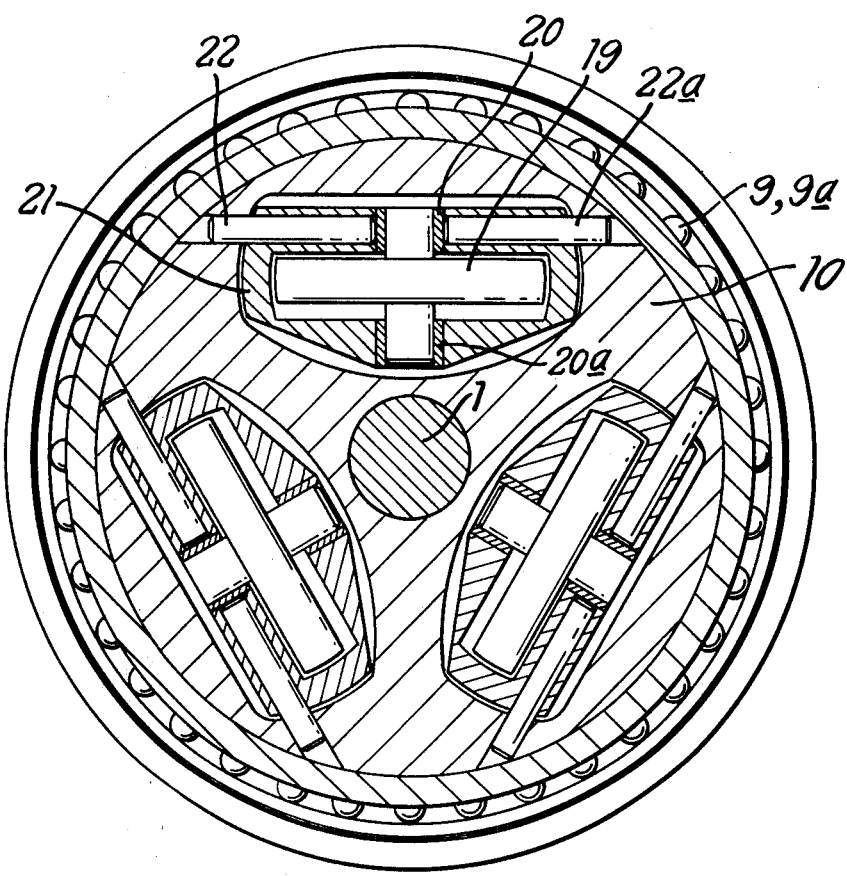
FIG. 2 is a cross-sectional view along the line 2—2 of FIG. 1.

Comparing FIGS. 1, 2 and 3 to each other, it will be seen that radially outward displacement of balls 13 displaces plates 14 and 16 axially rightwardly in the FIGS. against the resistance of spring 23, thereby pivoting each roller 19 about its pivot 22, 22a, in a counterclockwise direction, as viewed in the FIGS. Radially inward movement of balls 13 will cause spring 23 to displace plate 14, 16 axially leftwardly and cause clockwise (as viewed in the FIGS.) rotation of rollers 19.

Figure 4:
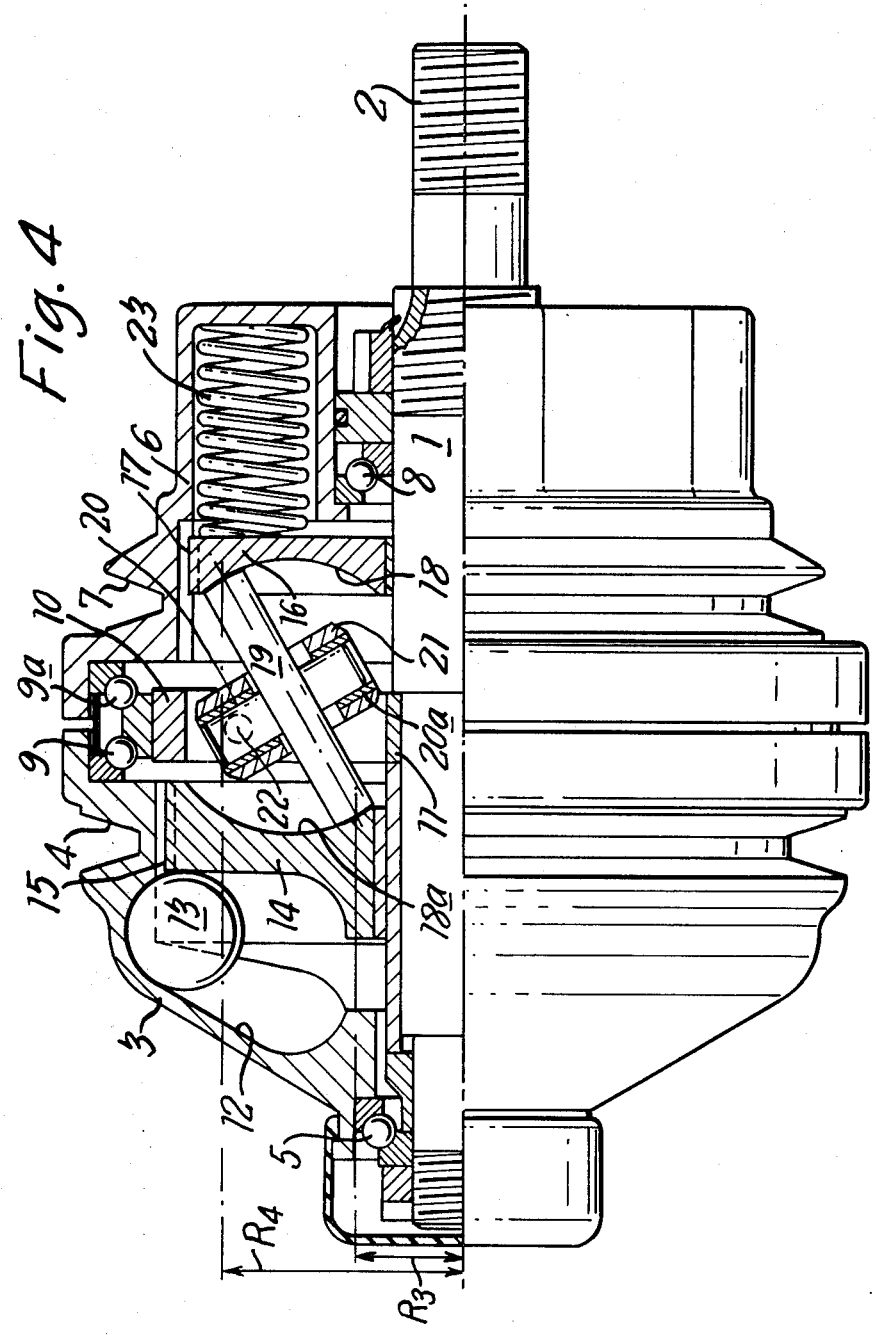
FIG. 4 is a view similar to the one illustrated in FIGS. 1 and 3 but showing the device at the maximum speed of its operating range.
Figure 5:
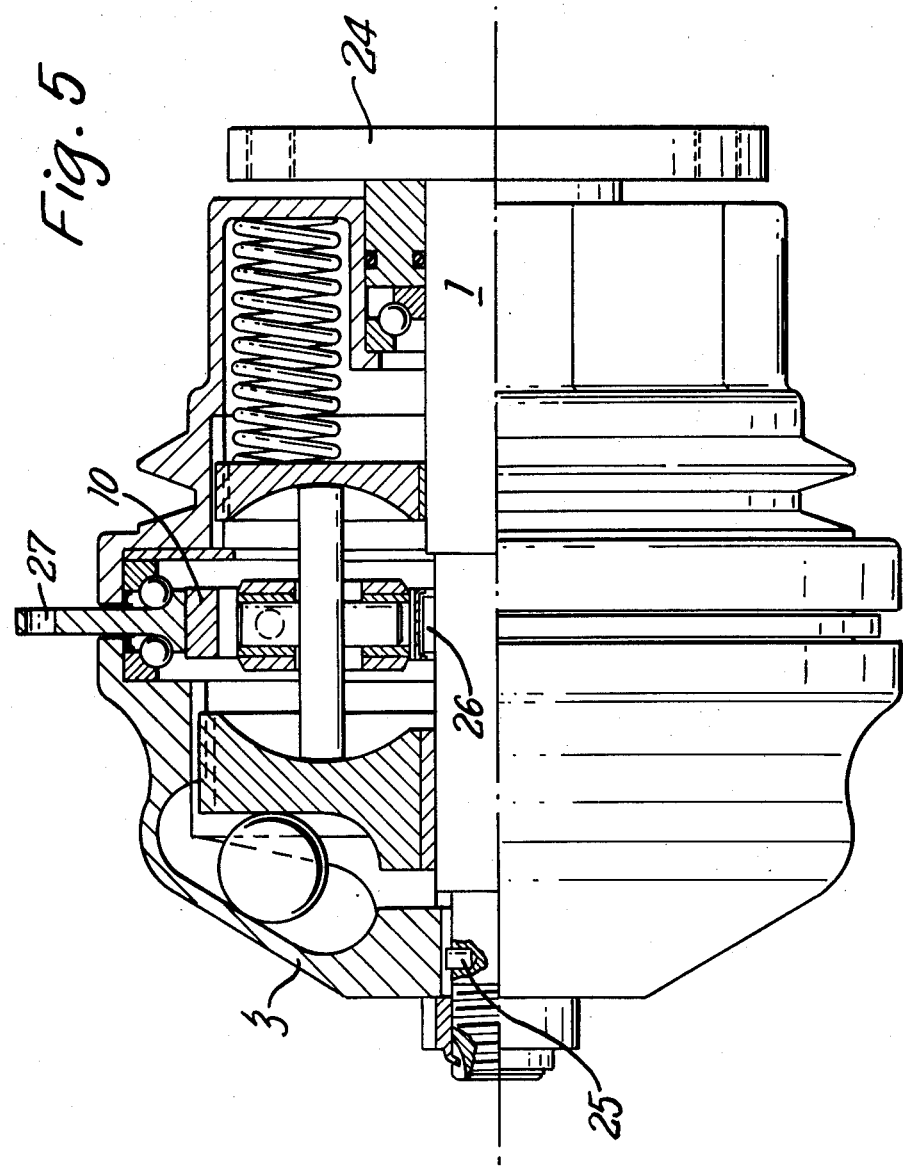
FIG. 5 is a side view, partly in section, of another embodiment in which the device is directly coupled, at one of its ends, to the crankshaft of a vehicle engine.

FIG. 4 shows the device at the other extreme of operation. The centrifugal forces on the balls have reached the maximum and the slewing of the rollers in the opposite direction alters the angular velocity of the input/output pulleys to the order of $R_4/R_3$.

FIG. 5 shows an embodiment of the invention in which the pulley 4 has been omitted and the device is now driven by the front end of the engine crankshaft. In this instance the shaft 1 rotates and is provided with a mounting flange 24 for coupling it to the crankshaft. At the other end the shaft is keyed at 25 to the housing 3 which it now drives. All else remains as in the embodiment illustrated in FIGS. 1 to 4 except that the centre disc 10 must be rotationally free from the shaft 1 and is provided with a bearing 26 for this purpose. An extension 27 from the disc 10 acts as a torque arm by which the disc is held stationary while the appropriate parts of the device rotate around it.

Figure 6:
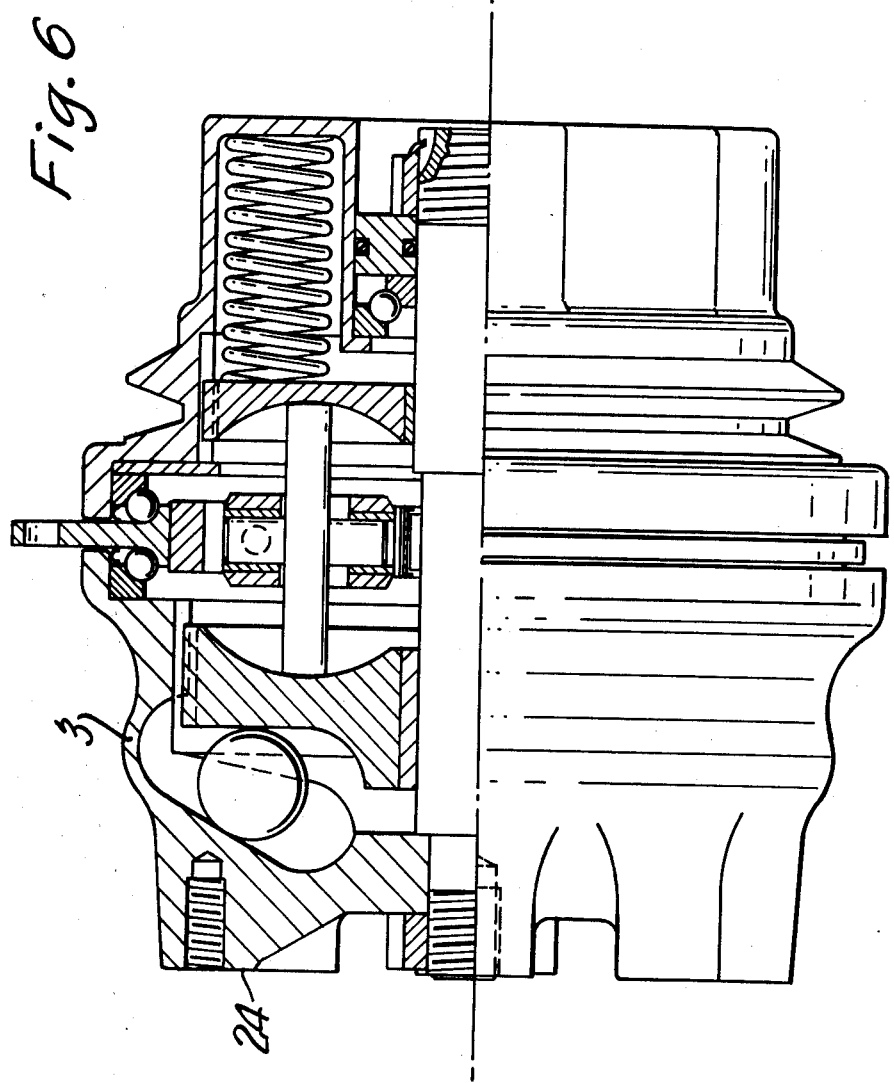
FIG. 6 is a view of a further embodiment of the invention similar to the one illustrated in FIG. 5 but differing therefrom by being coupled, at its other end, to the crankshaft.

FIG. 6 is a modification of the embodiment illustrated in FIG. 5. In this case the driving flange 24 has been transferred to the other end of the device and is formed integral with the housing 3. In all other respects the device is the same as that of FIG. 5.

Figure 7:
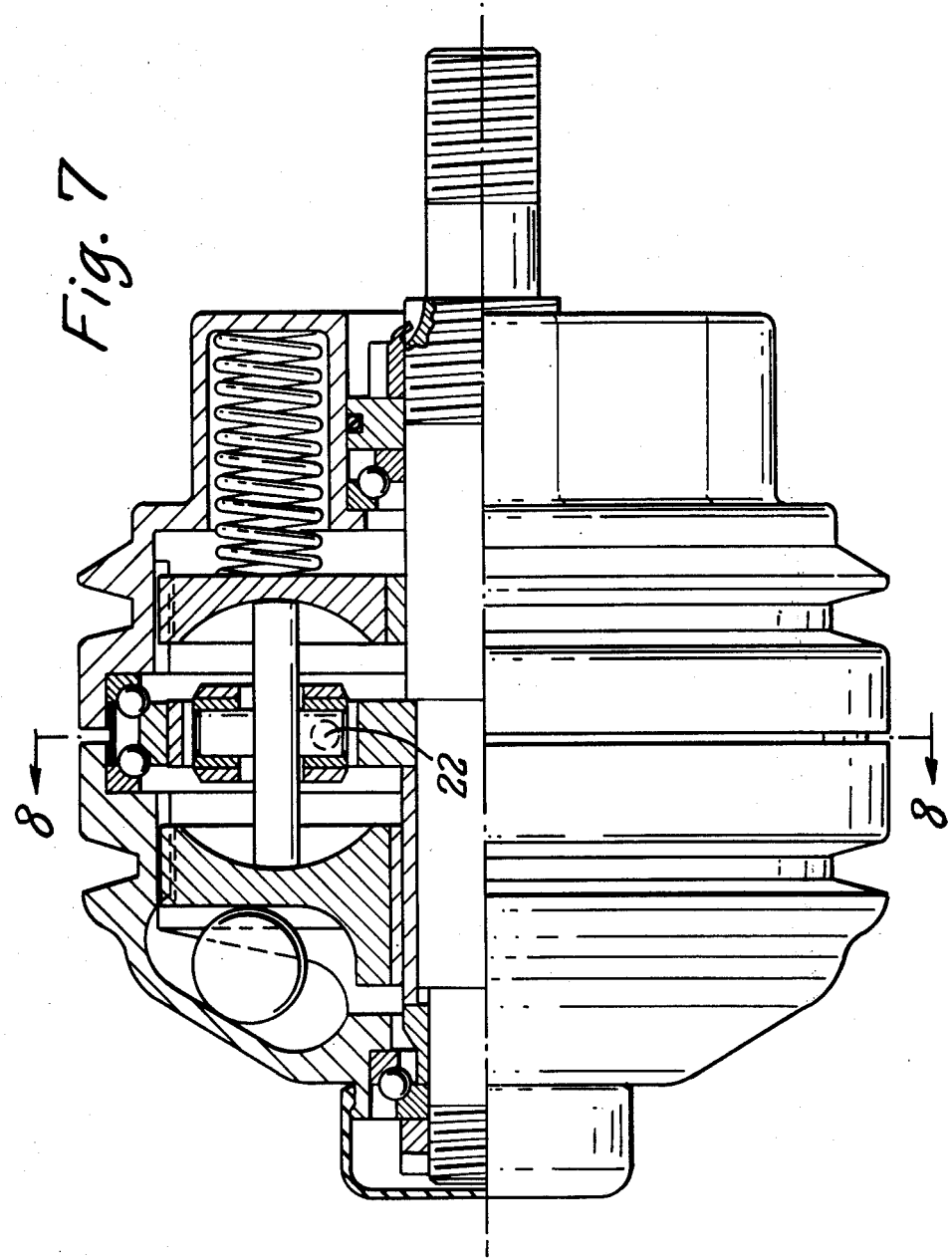
FIG. 7 is a side view, partly in section, of yet a further embodiment of the invention differing from the others by a reversal of the positions of driving and driven plates.
Figure 8:
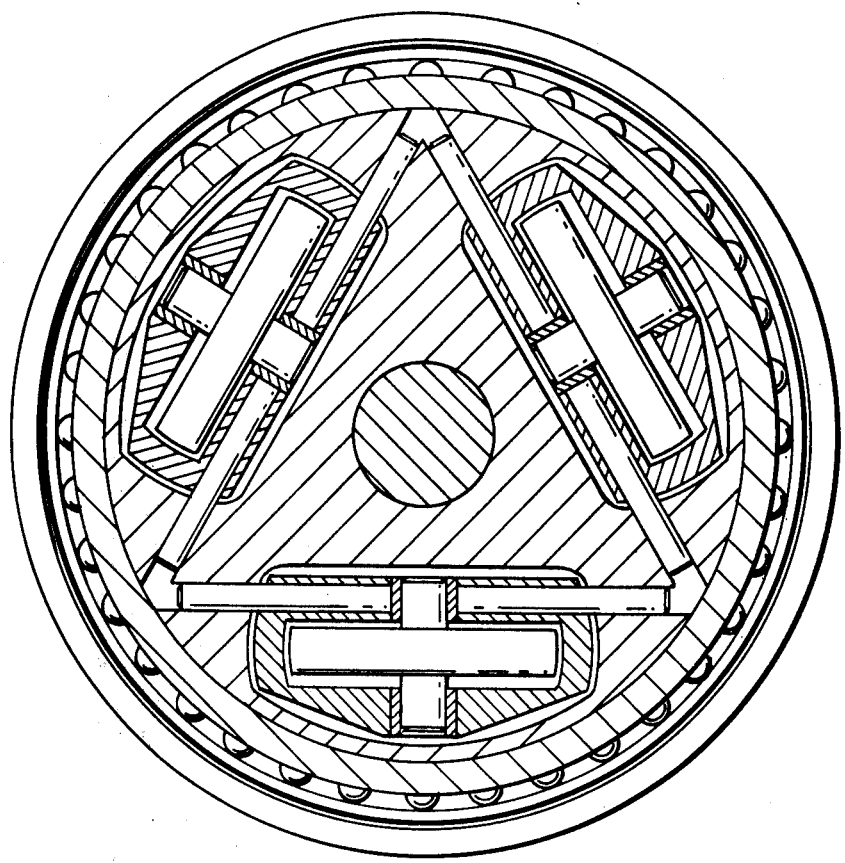
FIG. 8 is a cross-sectional view along the line 8—8 of FIG. 7.

FIGS. 7 and 8 show another modification of the device illustrated in FIG. 1. Here the driving and driven pulleys have been reversed, which means that to function correctly, the rotational axes of the rollers 19 must skew in the opposite direction in order to provide the appropriate ratio change. This has been achieved by moving the pivotal axes 22 and 22a radially inwardly of the axis of rotation of the rollers. All else remains the same.

What we claim is:

1. A speed control device comprises coaxially mounted, axially displaceable, rotatable driving and driven plates,
   a driven housing receiving the driving plate and a driving housing receiving the driven plate, the two housings being axially immovable and coaxially mounted with the two plates, each housing being connected to its associated plate in a manner whereby the associated plate and housing must rotate together but the plates are axially slidable relative to their associated housings,
   said driving and driven plates having surfaces defining opposed annular grooves facing each other to define a generally toroidal track therebetween,
   at least one roller mounted for rotation with the track,
   biasing means to bias the plates axially towards the at least one roller and to effect engagement of the surfaces defining the opposed grooves with the at least one roller, the action of the biasing means on at least one of the plates being responsive to the speed of rotation of its associated housing,
   means pivotably mounting the at least one roller for movement about an axis which is substantially normal to the axis of rotation of that roller and remote from the radial plane of rotation of that roller whereby, upon axial displacement of at least one of the plates, the roller is pivoted to displace radially relative to the axis of rotation of the plate, the position of engagement of the at least one roller with the surfaces defining the respective opposed grooves, to effect a change in ratio of angular velocity at which the driving plate is driven relatively to the driven plate.

2. The speed control device of claim 1 further including a plurality of rollers, the rollers being symetrically arranged around the axis of roation of the plates.

3. The device of claim 2 including three rollers, each mounted on a respective one of a plurality of carriers, each of the carriers being pivotably mounted about the axis substantially normal to the axis of rotation of that roller.

4. The device of claim 3 in which the carriers are mounted on a centre disc which is axially immovable.

5. The device of claim 1 wherein biasing means are carried in both the respective housings.

6. The device of claim 5 wherein at least one of the housings carries biasing means which are centrifugally operable.

7. The device of claim 6 wherein the housing other than the one containing the centrifugally operable biasing means contains resilient biasing means which resist movement of the plates by the centrifugally operable biasing means.

8. The device of claim 6 wherein the centrifugally operable biasing means comprises at least two balls located in a space formed between axially opposed and radially extending faces of its associated housing and plate, the opposed faces converging as they recede from the axis of rotation of the plate and wherein radially extending grooves, each accomodating a respective one of the balls, is provided in the space such that as the balls are displaced radially outwardly by centrifugal force they act against the opposed faces to axially displace the plate in the direction towards the other plate.

9. The device of claim 8, wherein the centrifugal biasing means are in the driven housing and the resilient biasing means is a spring in the driving housing.

10. The device of claim 1 wherein the plates are mounted on a common shaft.

11. The device of claim 10 wherein the shaft is stationary and the housings and their associated plates rotate about the shaft.

12. The device of claim 10 wherein the shaft is rotatable and the driven plate and its associated driving housing are mounted on the shaft so as to be rotatable relative thereto and the driven housing and its associated driving plate are mounted on the shaft for rotation therewith.

13. The device of claim 10 wherein the driving housing contains an integral pulley formed in its peripheral wall.

14. The device of claim 1 wherein both housings are supported at their axially inner opposing faces by a centre disc which in turn is supported by a shaft which is coaxially disposed relative to the plates and housings, and the at least one roller is mounted pivotably on the centre disc.

15. The device of claim 1 wherein both of said housings have an integral pulley formed on their respective peripheral walls.

16. The device of claim 1 wherein the axis about which the at least one roller is pivotably mounted is, relatively to the axis of rotation of the plates, radially outward of the roller.

17. The device of claim 1 wherein the axis about which the at least one roller is pivotably mounted is, relatively to the axis of rotation of the plates, radially inward of the roller.

18. A speed control device comprises coaxially shaft-mounted, axially displaceable, driving and driven plates, which are rotatable about the shaft on which they are mounted, two rotatable, axially immovable housings coaxially mounted with the plates, one housing having means thereon to connect it for being driven in rotation and receives the driving plate which is keyed to the one housing in a manner whereby the driving plate must rotate with its housing but is axially movable relative thereto, the other housing having an integral driving pulley formed thereon and receiving the driven plate which is keyed to the other housing in a manner whereby the other housing must rotate with its driven plate but its plate is axially displaceable relative thereto, an annular groove of part circular cross-section formed in, respectively, both the driving and driven plates, the grooves facing each other to define therebetween a generally toroidal track, two or more rollers mounted on a respective one of two or more carriers, centrifugally operable biasing means and resilient biasing means respectively disposed in separate ones of the two housings, and cooperating to bias the rollers into rolling contact with both of the facing grooves, the centrifugally operable biasing means comprises radially displaceable balls located in a space formed between axially opposed and radially extending faces of the plate and its associated housing, the opposed faces of the plate and housing converging as they recede from the axis of rotation of the plates, and wherein radially extending grooves, each accommodating a respective one of the balls, is provided in the space such that as the balls are displaced radially outwardly by centrifugal force they act against the opposed faces to axially displace the plate in the direction towards the other plate, each of the carriers being pivotably mounted on an axially immovable support about an axis substantially normal to the axis of rotation of its associated roller, and remote from the radial plane of rotation of that roller whereby, upon axial displacement of the plates, the roller is pivoted to radially displace the position of engagement of the rollers with the respective facing grooves to effect a change in ratio of angular velocity at which the driving plate is driven relatively to the driven plate.

19. The device of claim 18 wherein the means connected to the one housing for driving the one housing in rotation is an integral pulley.

20. The device of claim 18 wherein the plates and the housings are connected to a common shaft, and the centrifugally operable biasing means is disposed in the one housing and the resilient biasing means is a spring disposed in the other housing.

* * * * *